United States Patent
Choi

(10) Patent No.: US 8,462,836 B2
(45) Date of Patent: Jun. 11, 2013

(54) METHOD FOR DETECTING OFFSET SIGNAL CORRESPONDING TO TRANSMISSION LEAKAGE SIGNAL

(75) Inventor: Heon soo Choi, Gwangmyeong-si (KR)

(73) Assignee: Nethom Co., Ltd., Gunpo-Si, Gyeonggi-Do (KR)

( * ) Notice: Subject to any disclaimer, the term of this patent is extended or adjusted under 35 U.S.C. 154(b) by 136 days.

(21) Appl. No.: 13/028,146

(22) Filed: Feb. 15, 2011

(65) Prior Publication Data

US 2011/0200083 A1   Aug. 18, 2011

(30) Foreign Application Priority Data

Feb. 18, 2010   (KR) .................. 10-2010-0014713

(51) Int. Cl.
*H04B 17/00*   (2006.01)
(52) U.S. Cl.
USPC .......................................... 375/224; 375/226
(58) Field of Classification Search
USPC .................................................. 375/224, 226
See application file for complete search history.

(56) References Cited

U.S. PATENT DOCUMENTS 5,675,286 A * 10/1997 Baker et al. ................. 330/129
2004/0230393 A1   11/2004 Andersson

FOREIGN PATENT DOCUMENTS

| JP | 1995074684 | 3/1995 |
| JP | 2005007486 | 1/2005 |
| JP | 2009253904 | 10/2009 |
| WO | 2004095763 | 11/2004 |
| WO | 2008048534 | 4/2008 |

* cited by examiner

*Primary Examiner* — Shuwang Liu
*Assistant Examiner* — Michael Neff
(74) *Attorney, Agent, or Firm* — Lee, Hong, Degerman, Kang & Waimey

(57) ABSTRACT

A method for detecting offset signal corresponding to transmission leakage signal is disclosed, whereby reception sensitivity can be improved by accurately offsetting a leakage signal in transmission signal mixedly inputted into the reception signal in a radio transceiver, and an offset signal corresponding to a transmission leakage signal can be rapidly detected in the radio transceiver to rapidly offset the transmission leakage signal included in a reception signal.

6 Claims, 4 Drawing Sheets

METHOD FOR DETECTING OFFSET SIGNAL CORRESPONDING TO TRANSMISSION LEAKAGE SIGNAL

CROSS-REFERENCE TO RELATED APPLICATIONS

Pursuant to 35 U.S.C. §119 (a), this application claims the benefit of earlier filing date and right of priority to Korean Patent Application No. 10-2010-0014713, filed on Feb. 18, 2010, the contents of which are hereby incorporated by reference in their entirety.

TECHNICAL FIELD

The teachings in accordance with the exemplary embodiments of this invention relate generally to method for detecting offset signal corresponding to transmission leakage signal, and more particularly to method for detecting offset signal corresponding to transmission leakage signal that is employed in radio transceiver system.

BACKGROUND ART

Disclosure

Technical Problem

In a case of a system using the same transmission and reception frequencies like an RFID system, an isolation device is required to isolate a transmission signal from a reception signal. For example, in the RFID system, a reader uses a circulator or a directional coupler for isolating a transmission signal from a reception signal. In a general transceiver communication system, one antenna is used, and different frequencies are used when transmitting and receiving signals. At this time, part of the transmission signal is leaked to be mixed with the reception signal. Thus, for isolation between signal transmission and signal reception, an element that operates on different paths according to frequencies, such as a circulator or a directional coupler is used, thereby separating the transmission signal from the reception signal.

In other words, in a transmission and reception system using a same frequency, transmission and reception signals are separated from each other by using an element for transmitting a signal only in one direction according to an input port. As an example thereof, a circulator or a directional coupler that is an element for separating transmission and reception signals is used.

To be more specific, due to issues of size and portability, some communication devices comprise only one antenna for both transmit and receive functions. An example of such a communication device is the portable RFID interrogator (or reader) device. Typically, the communication device using only one antenna for both transmit and receive functions require a unit (or component), such as a circulator or a directional coupler, to separate the receive signal path from the transmit signal path in the communication device.

However, with any unit performing the function of separating the reception signal path from the transmission signal path, a leakage signal exists from the transmission signal path (mixes with) to the reception signal path within the said unit. As the power of the transmission signal is typically higher than the power of the reception signal, the power of the leakage signal may be comparable to the power of the reception signal. Accordingly, the leakage signal may significantly degrade the ability to detect and to process the reception signal. Therefore, there is a need to offset the transmission leakage signal.

A conventional way to solve the problem arising from the said transmission leakage signal is by using a circuit in which an offset signal having a phase of same magnitude as but with opposite phase to the transmission leakage signal is detected, the extracted offset signal is coupled to the reception signal to offset the transmission leakage signal that contains the reception signal. To this end, it is essential to find an offset signal having the same magnitude but opposite phase as the transmission leakage signal.

However, it was difficult in the conventional way to precisely detect and track a magnitude and phase of a transmission leakage signal, such that an optimal offset vector was detected using a method for sequentially scanning an entire area of an I/Q (In-phase/Quadrature) vector phase-plane. However, in a case of detecting an offset signal by scanning an entire area of the I/Q vector phase-plane; there exists a problem of requiring many detecting hours due to resolution. Another problem is that resolution has to be upgraded to increase an offset level by precisely detecting the offset vector, which is a factor of increasing the detecting time geometrically.

Technical Solution

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a method for detecting offset signal corresponding to transmission leakage signal, the method characterized by: (a) setting a leakage signal of a transmission signal on a vector phase-plane relative to magnitude and phase; (b) dividing the vector phase-plane to a plurality of areas to determine a plurality of sample points for each divided area; (c) sequentially detecting a vector from any one sample point selected from the plurality of sample points to another sample point based on each area; (d) calculating a gradient of a resultant vector relative to the detected vector; (e) checking if the resultant vector has converged into a current area; (f) repeating the (b) through (e) steps at least once, if there exists a descent gradient converging into the current area; (g) determining as an offset signal corresponding to the transmission leakage signal using a maximum descent gradient among the gradients detected in the (f) step.

Preferably, the vector phase-plane is divided into areas of a quadrant.

Preferably, the plurality of sample points is such that a sample point is centrally positioned (central sample point), and sample points other than the central sample point encompass the central sample point to be symmetrically positioned.

Preferably, the other sample points are positioned at a vertex of a square, and the central sample point is positioned at a center of the square.

Preferably, the (e) step includes checking if the central sample point is positioned below a planar surface of the other sample points among the plurality of sample points to determine whether the resultant vector has converged.

Preferably, the gradient is a surface gradient of the vector plane.

Preferably, the (g) step includes determining a lowermost point corresponding to the maximum descent gradient, and determining the lowermost point as an offset signal corresponding to the transmission leakage signal.

Advantageous Effects

The method for detecting offset signal corresponding to transmission leakage signal according to the present invention has an advantageous effect in that reception sensitivity can be improved by accurately offsetting a leakage signal in transmission signal mixedly inputted into the reception signal in a radio transceiver.

The method for detecting offset signal corresponding to transmission leakage signal according to the present invention has another advantageous effect in that an offset signal corresponding to a transmission leakage signal can be rapidly detected in a radio transceiver to rapidly offset the transmission leakage signal included in a reception signal.

DESCRIPTION OF DRAWINGS

The teachings of the present invention can be readily understood by considering the following detailed description in conjunction with the accompanying drawings, and like numbers refer to like elements throughout and explanations that duplicate one another will be omitted, in which.

BEST MODE

Figure 1:
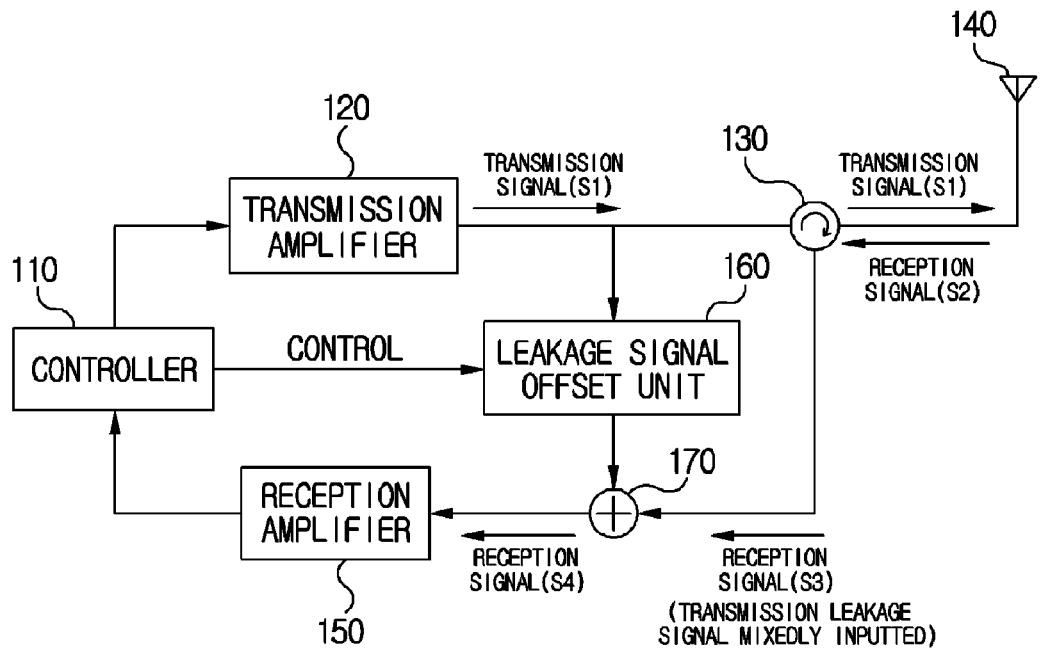
FIG. 1 is a schematic diagram illustrating a radio transceiver according to the present invention.

The following description is not intended to limit the invention to the form disclosed herein. Consequently, variations and modifications commensurate with the following teachings, and skill and knowledge of the relevant art are within the scope of the present invention. The embodiments described herein are further intended to explain modes known of practicing the invention and to enable others skilled in the art to utilize the invention in such, or other embodiments and with various modifications required by the particular application(s) or use(s) of the present invention.

The disclosed embodiments and advantages thereof are best understood by referring to FIGS. 1-5 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments, and protected by the accompanying drawings. Further, the illustrated figures are only exemplary and not intended to assert or imply any limitation with regard to the environment, architecture, or process in which different embodiments may be implemented.

Accordingly, the described aspect is intended to embrace all such alterations, modifications, and variations that fall within the scope and novel idea of the present invention.

It will be understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. That is, the terms "including", "includes", "having", "has", "with", or variants thereof are used in the detailed description and/or the claims to denote non-exhaustive inclusion in a manner similar to the term "comprising".

Furthermore, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted. Now, the present invention will be described in detail with reference to the accompanying drawings.

The terms "first," "second," and the like, herein do not denote any order, quantity, or importance, but rather are used to distinguish one element from another, and the terms "a" and "an" herein do not denote a limitation of quantity, but rather denote the presence of at least one of the referenced item.

In describing the present invention, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Now, the present invention will be described in detail with reference to the following drawings.

FIG. 1 is a schematic diagram illustrating a radio transceiver according to the present invention.

Referring to FIG. 1, a transmission signal S1 generated by a controller 110 in a radio transceiver according to the present invention is amplified by a transmission amplifier 120 and transmitted to an antenna 140 through a circulator 130. A reception signal S2 received by the antenna 140 is amplified by a reception amplifier 150 through the circulator 130 to be inputted into the controller 110.

At this time, part of the transmission signal S1 is leaked due to limitation of isolation level between a transmission end and a reception end when the transmission signal S1 is transmitted to the antenna 140 through the circulator 130, whereby a transmission leakage signal-mixed reception signal S3 is transmitted.

In order to offset the transmission leakage signal mixed or inputted in the reception signal S3, part of the transmission signal S1 is branched to be transmitted to a leakage signal offset unit 160. The leakage signal offset unit 160 detects an offset signal whose magnitude is same as that of the transmission leakage signal but with an opposite phase, using the transmission signal S1 in response to control of the controller 110, and transmits the offset signal to a mixer 170.

The mixer 170 mixes the offset signal corresponding to the transmission leakage signal with the reception signal S3 to offset the transmission leakage signal and to transmit a pure reception signal S4 to the reception amplifier 150.

As apparent from the foregoing, the present invention is to provide a method for rapidly and accurately detecting an offset signal whose magnitude is same as that of the transmission leakage signal but with an opposite phase from the leakage signal offset unit 160. To this end, it is important to detect a magnitude and a phase of an offset signal having the largest offsetting effect relative to the transmission leakage signal. Hereinafter, the method for detecting offset signal corresponding to transmission leakage signal according to the present invention will be described in detail.

FIGS. 2A through 2D are schematic views illustrating I/Q vector phase-plane for describing a method for detecting offset signal corresponding to transmission leakage signal according to the present invention.

Referring to FIGS. 2A through 2D, the method for detecting offset signal corresponding to transmission leakage signal according to the present invention is to provide a method for detecting an offset signal having the same magnitude as that of the transmission leakage signal but having a phase opposite to the transmission leakage signal, using the leakage signal offset unit 160 of a radio transceiver where a radio signal is simultaneously transmitted and received.

Figure 2A:
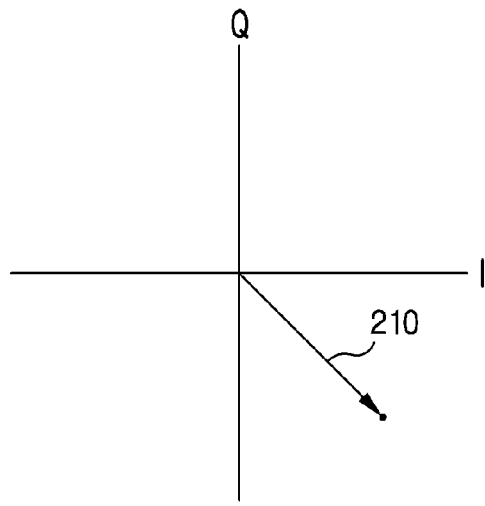
FIGS. 2A through 2D are schematic views illustrating an I/Q vector phase-plane for describing a method for detecting offset signal corresponding to transmission leakage signal according to the present invention.

First, as illustrated in FIG. 2A, the leakage signal offset unit 160 sets a transmission leakage signal 210 on I/Q vector phase-plane, in order to detect a transmission leakage signal using a signal inputted and partially branched from a transmission signal. The transmission leakage signal 210 may be set up on any point of I/Q vector phase-plane, because the transmission leakage signal 210 is unknown in magnitude and phase thereof.

Successively, the vector phase-plane is divided into a plurality of areas, and each area is determined with a plurality of sample points A1~E1. FIG. 2A illustrates an example where the area is divided into quadrants for convenience sake. However, it is a simple example and the vector phase-plane may be divided into a plurality of areas in other exemplary embodiments.

Furthermore, although FIG. 2A initially illustrates a plurality of sample points A1~E1 on a first quadrant, other three (second to fourth) quadrants may be determined with sample points. At this time, a value of each sample point defines an offset level when that particular sample point is designated as an offset vector. A gradient toward a direction where the offset level grows large can be obtained, because a relative position of a sample point of a central point and a neighboring sample point is known.

Figure 2B:
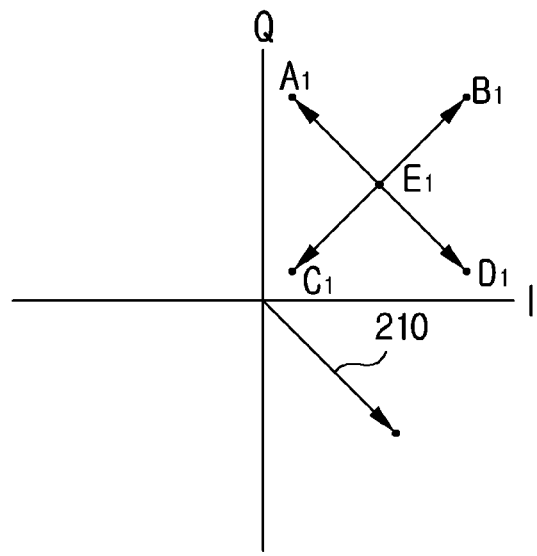

Successively, referring to FIG. 2B, offset level vectors are sequentially detected from any one sample point selected from the plurality of sample points to another sample point based on each divided area. An example is provided in FIG. 2B where a vector to other sample points A1~D1 is detected from a central sample point E1 among the plurality of sample points A1~E1 on a first quadrant.

As noted above, a resultant vector relative to each detected vector is obtained and a gradient of the resultant vector is calculated. The gradient is a surface gradient of I/Q vector phase-plane, whereby a resultant vector to a direction having the largest offset level in a relevant area can be obtained.

Furthermore, determination can be made as to whether the vector phase-plane has converged in or diverged out from a planar height relation between a sample point of a central point and other neighboring sample points. For example, a neighboring area of a relevant corresponding sample point is converged to allow the vector phase-plane to take the shape of a downwardly-concave form, if the central point is positioned underneath a plane comprised of neighboring points, which means that an optimal offset vector is situated within a relevant area.

Conversely, if the central point is positioned above a plane comprised of neighboring points, a neighboring area of a relevant sample point is diverged outside to make the vector phase-plane take the shape of a upwardly-convex form, which means that an optimal offset vector is situated at another area, i.e., outside of an area directed by the resultant vector. The convergence or divergence can be a basic data in detecting an offset signal.

At this time, a method of grasping a planar vertical relationship between a sample point of a central point and sample points of other neighboring sample points may be obtained by the following Equation 1, where an average value of offset level values of neighboring points, i.e., A1~D1, is obtained, and comparison is made with magnitude of the central point E1, and if the E1 is greater than the average value of A1~D1, the vector phase-plane takes the shape of a upwardly-convex form, and conversely if the E1 is smaller than the average value of A1~D1, the vector phase-plane takes the shape of a downwardly-concave form.

$$E1 > \frac{(A1 + B1 + C1 + D1)}{4}: \text{Upwardly-convex form} \quad \text{[Equation 1]}$$

$$E1 < \frac{(A1 + B1 + C1 + D1)}{4}: \text{Downwardly-concave form}$$

It should be noted that other methods than the Equation 1 can calculate a relationship with a plane where a central point is encompassed by neighboring points.

Figure 2C:
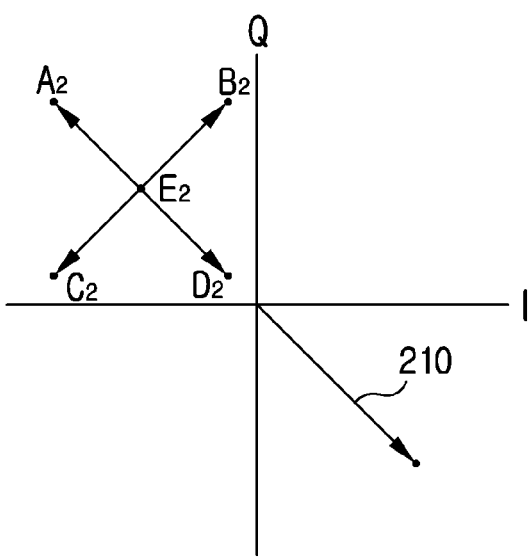

The process of FIG. 2B is repeated in other areas. That is, as shown in FIG. 2c, each vector is detected from any one sample point E2 to other sample points A2~D2 relative to sample points A2~E2 of second quadrant, and a resultant vector of these vectors is obtained to calculate a gradient of the resultant vector.

At this time, a gradient calculated from the current area (second quadrant) is compared with a gradient calculated from the previous area (first quadrant) to determine whether the gradient calculated from the current area (second quadrant) is a descent gradient that converges into the current area (second quadrant) over the gradient of the previous area (first quadrant). At this time, the descent gradient is such that a surface gradient at a relevant area is further increased, which means that it nears further to an optimal offset vector.

Based on this meaning, if the central point on the current area (second quadrant) is situated below a plane of the neighboring point, it means that an offset signal exists on the current area (second quadrant), and a maximum descent gradient converges to a lowermost point at a relevant area. At this time, the lowermost point becomes a point of an optimal offset signal which has the same magnitude as that of the transmission leakage signal but has a phase opposite to that of the transmission leakage signal.

Figure 2D:
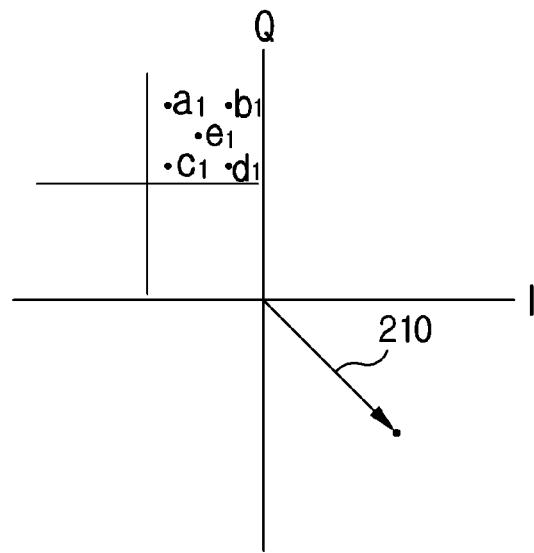

Therefore, in order to detect the lowermost point, if the central point on the current area (second quadrant) is situated below the plane of the neighboring points, the current area (second quadrant) is divided into a plurality of sub areas, as shown in FIG. 2D, where a plurality of sample points a1~e1 is determined for each sub area.

In doing so, the third and fourth quadrants can be eliminated from an offset signal detection area to markedly reduce a time for detecting the offset signal.

Each vector on the plurality of sample points a1~e1 is sequentially detected for each sub area divided on the second quadrant, and a sub area is determined where a gradient of a resultant vector to each vector is a descent gradient.

Successively, the determined sub areas are divided into a plurality of further smaller sub areas, and the above processes are repeated until the resultant vector reaches an optimal offset point, that is, a lowermost point where the resultant vector is zero. Preferably, the overall repetitive process is implemented at least more than once, and a repetitive frequency may be arbitrarily determined by a user until an optimal offset signal is detected.

Through the repetitive process, a maximum descent gradient is finally detected, and a lowermost point corresponding thereto is determined. The magnitude and phase of an offset signal corresponding to those of the transmission leakage signal are determined.

Figure 3:
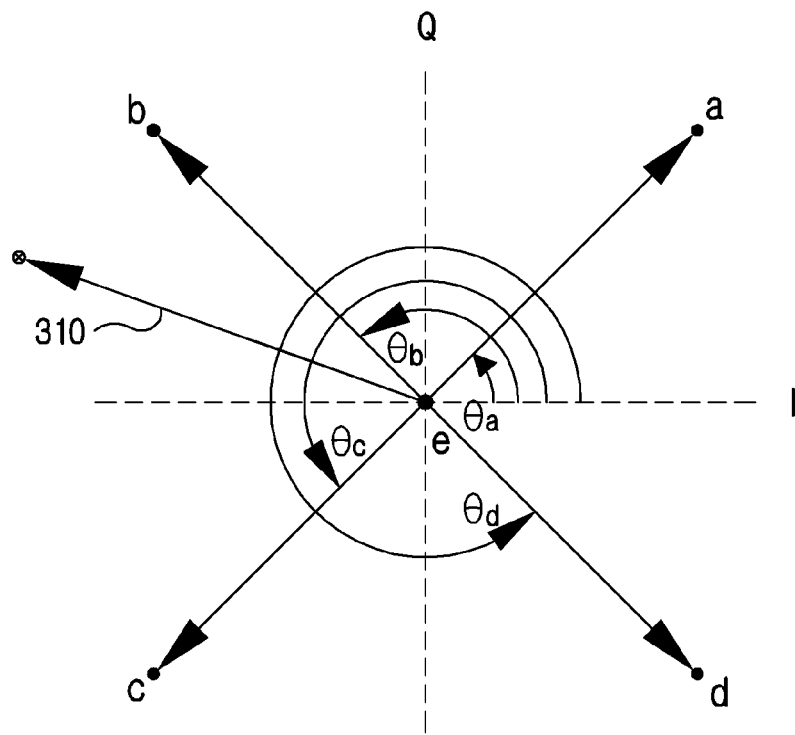
FIG. 3 is a schematic view of an example of a vector phase-plane for describing a gradient of a resultant vector according to an exemplary embodiment of the present invention.

FIG. 3 is a schematic view of an example of a vector phase-plane for describing a gradient of a resultant vector according to an exemplary embodiment of the present invention.

Referring to FIG. 3, assuming that there are four sample points a~d relative to the origin O on the vector phase-plane according to the present invention, vectors to four different sample points a~d are respectively detected from the origin O, and a resultant vector 310 from the detected vectors is obtained. Successively, a gradient of the resultant vector on the phase-plane is calculated. The gradient may be expressed in the shape of a vector on I/Q vector phase-plane according to the following Equation 2.

$$\text{Gradient vector } (G) = a\cos\varphi a - b\cos\varphi b - c\cos\varphi c + d\cos\varphi d + j(a\sin\varphi a + b\sin\varphi b - c\sin\varphi c - d\sin\varphi d) \quad \text{[Equation 2]}$$

Figure 4:
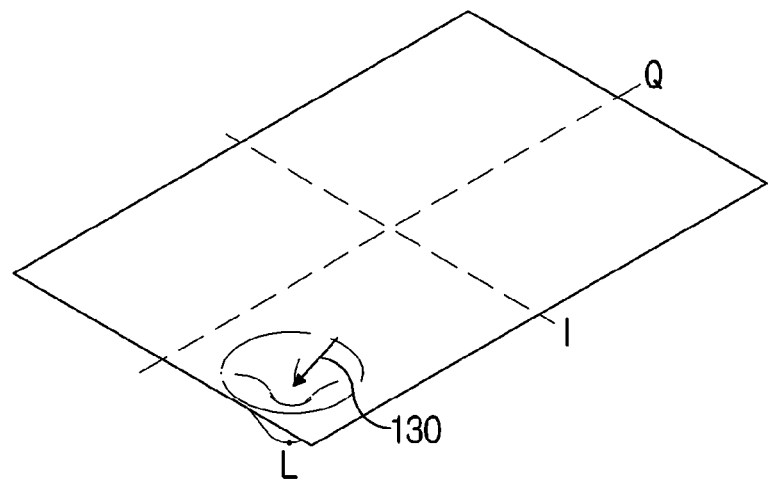
FIG. 4 is a schematic view of an example of a vector phase-plane about an offset signal according to an exemplary embodiment of the present invention.

Although the gradient vector G is illustrated on a plane in the drawing, the gradient vector G may be expressed in curvature on I/Q vector phase-plane as it nears to the offset signal, which is shown in FIG. 4.

FIG. 4 is a schematic view of an example of a vector phase-plane about an offset signal according to an exemplary embodiment of the present invention.

Referring to FIG. 4, the offset signal according to an exemplary embodiment of the present invention is determined by the resultant vector on I/Q vector phase-plane being on a concave surface (an area where the central point is smaller than a plane of neighboring point) and a zero point, that is, by the resultant vector being a lowermost point. FIG. 4 illustrates an example where the offset signal converges in from a particular area on I/Q vector phase-plane.

The gradient of the resultant vector 310 on an area near the lowermost point L is a descent gradient. At this time, the lowermost point L is being detected while an area is reduced to a direction where the descent gradient is great. The magnitude and phase of the offset signal are determined by magnitude and phase of a vector to the lowermost point L.

Mode for Invention

Figure 5:
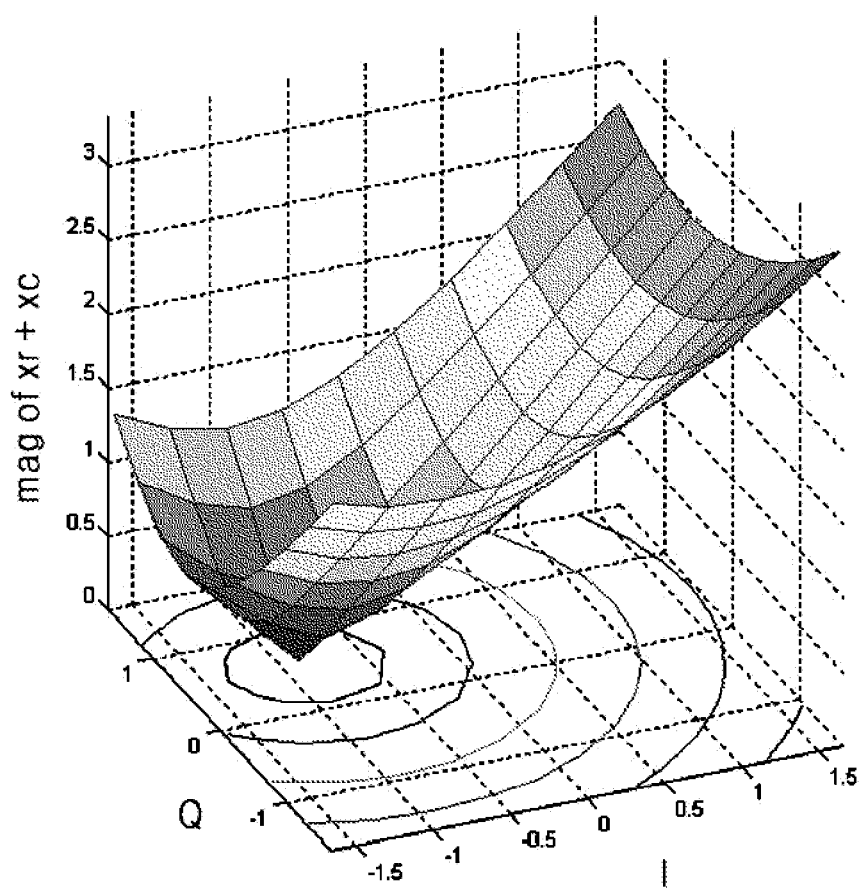
FIG. 5 is a schematic simulation view illustrating an I/Q vector phase-plane for detecting an offset signal according to the present invention.

FIG. 5 is a schematic simulation view illustrating I/Q vector phase-plane for detecting an offset signal according to the present invention.

FIG. 5 shows a simulated phenomenon where a surface gradient of I/Q vector phase-plane becomes greater on a particular area, and a relevant area converges.

The method for detecting the offset signal is such that a magnitude and a phase of an area that converges to a lowermost point are detected. The magnitude and phase of a signal are same as those of the transmission leakage signal, but the signal being opposite to that of the transmission leakage signal. The signal is determined as an offset signal corresponding to the transmission leakage signal.

The previous description of the present invention is provided to enable any person skilled in the art to make or use the invention. Various modifications to the invention will be readily apparent to those skilled in the art, and the generic principles defined herein may be applied to other variations without departing from the spirit or scope of the invention. Thus, the invention is not intended to limit the examples described herein, but is to be accorded the widest scope consistent with the principles and novel features disclosed herein.

INDUSTRIAL APPLICABILITY

Radio communication technologies such as RFID and NFC are widely used in many industrial fields. Transmission and reception signals are simultaneously generated in the radio communication technologies where part of the transmission signal is leaked to create a phenomenon where the reception signal is included in the transmission signal. To prevent the phenomenon, a technology to isolate the transmission terminal from the reception terminal has received a high interest.

In view of the fact, the present invention has an industrial applicability in that reception sensitivity can be improved in the radio communication due to the fact that an offset signal for offsetting the transmission leakage signal that is leaked from a transmission signal and then included in the reception signal can be rapidly and accurately detected. Therefore, the present invention can be effectively employed to radio communication technologies and radio transceiver systems.

The invention claimed is:

1. A method for determining an offset signal corresponding to a transmission leakage signal via a leakage signal offset unit located in a radio transceiver, the method comprising:

setting, by the leakage signal offset unit, a leakage signal of a transmission signal on a vector phase-plane relative to a magnitude and a phase;

dividing, by the leakage signal offset unit, the vector phase-plane into a plurality of areas in order to obtain a plurality of sample points for each of the plurality of areas;

sequentially detecting, by the leakage signal offset unit, a vector between a first sample point and a second sample point among the plurality of sample points for each of the plurality of areas;

calculating, by the leakage signal offset unit, a gradient of a resultant vector relative to the detected vector;

determining, by the leakage signal offset unit, whether the resultant vector has converged into a current area by determining whether a central sample point is positioned below a planar surface of other sample points among the plurality of sample points;

repeating, by the leakage signal offset unit, setting the leakage signal, dividing the vector phase-plane, sequentially detecting the vector, calculating the gradient, and determining whether the resultant vector has converged at least once when a descending gradient converging into the current area is detected; and determining, by the leakage signal offset unit, the offset signal corresponding to the transmission leakage signal by using a maximum descending gradient among the detected descending gradients.

2. The method of claim 1, wherein the plurality of areas forms a quadrant.

3. The method of claim 1, wherein:

the central sample point is positioned at a center of an area comprising the plurality of sample points; and the other sample points symmetrically surround the central sample point.

4. The method of claim 3, wherein:

the other sample points are positioned at a vertex of a square; and the central sample point is positioned at a center of the square.

5. The method of claim 1, wherein the calculated gradient corresponds to a surface gradient of the vector phase-plane.

6. The method of claim 1, further comprising:

determining a lowest point corresponding to the maximum descending gradient; and determining the offset signal corresponding to the transmission leakage signal by using the determined lowest point.

* * * * *